US012623577B2

(12) United States Patent
Turner et al.

(10) Patent No.: US 12,623,577 B2
(45) Date of Patent: May 12, 2026

(54) SYSTEM AND METHOD OF ESTIMATING ENERGY FLOW TO AN OCCUPANT FROM A HEATING ELEMENT OF A VEHICLE SEAT

(71) Applicant: GENTHERM GMBH, Odelzhausen (DE)

(72) Inventors: Kenneth Turner, Royal Oak, MI (US); Mahmoud Abdalla Harraz, West Lafayette, IN (US)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 19/124,910

(22) PCT Filed: Dec. 8, 2023

(86) PCT No.: PCT/IB2023/062418
§ 371 (c)(1),
(2) Date: Apr. 28, 2025

(87) PCT Pub. No.: WO2024/121812
PCT Pub. Date: Jun. 13, 2024

(65) Prior Publication Data
US 2026/0008390 A1 Jan. 8, 2026

Related U.S. Application Data

(60) Provisional application No. 63/431,061, filed on Dec. 8, 2022.

(51) Int. Cl.
*B60N 2/56* (2006.01)
*G01K 17/00* (2006.01)
(Continued)

(52) U.S. Cl.
CPC ........... *B60N 2/5685* (2013.01); *G01K 17/00* (2013.01); *G01N 25/18* (2013.01); *B60R 16/033* (2013.01)

(58) Field of Classification Search
CPC ...... B60N 2/5685; G01K 17/00; G01N 25/18; B60R 16/033
See application file for complete search history.

(56) References Cited

U.S. PATENT DOCUMENTS 5,948,297 A 9/1999 Haubner et al.
7,530,851 B2 5/2009 Parnis
(Continued)

FOREIGN PATENT DOCUMENTS

DE 10002286 A1 7/2001
EP 1270287 * 2/2003

OTHER PUBLICATIONS

International Search Report and Written Opinion of the International Searching Authority dated Mar. 20, 2024, for PCT/IB2023/062418.

*Primary Examiner* — Joan T Goodbody
*Assistant Examiner* — Godfrey Aleksander Maciorowski
(74) *Attorney, Agent, or Firm* — The Dobrusin Law Firm, P.C.

(57) ABSTRACT

A heating system and method that includes a heating element configured to generate heat; and a controller configured to: determine a value representative of an ambient cabin temperature; supply the power to the heating element to; measure the power supplied to the heating element or obtain a value representative of the power supplied to the heating element; determine or calculate a temperature of the heating element; determine heat loss from the vehicle seat to atmosphere surrounding the vehicle seat based on a temperature difference between the ambient cabin temperature and the temperature of the heating element; estimate an (Continued)

amount of heat transferred from the vehicle seat to an occupant of the vehicle seat based on the measured power supplied to the heating element and the determined heat loss from the vehicle seat to an ambient environment surrounding the vehicle seat; and adjust the power supplied to the heating element.

15 Claims, 3 Drawing Sheets

(51) Int. Cl.
    *G01N 25/18*         (2006.01)
    *B60R 16/033*      (2006.01)

(56)               References Cited

U.S. PATENT DOCUMENTS

| | | | |
|---|---|---|---|
| 10,889,256 B2 | 1/2021 | Josefsson et al. | |
| 2012/0234815 A1* | 9/2012 | Willey ................. | B60N 2/5685 |
| | | | 219/217 |
| 2019/0101945 A1* | 4/2019 | Marquette ................ | B62D 1/06 |

* cited by examiner

*Figure 1: Thermal Flow Diagram of a Simplified Seat Stack up*

SYSTEM AND METHOD OF ESTIMATING ENERGY FLOW TO AN OCCUPANT FROM A HEATING ELEMENT OF A VEHICLE SEAT

CROSS-REFERENCE TO RELATED APPLICATIONS

This application is a US National Stage entry of PCT/IB2023/062418 filed on Dec. 8, 2023, which claims priority to U.S. 63/431,061 filed on Dec. 8, 2022, the entireties of which are hereby incorporated by reference herein for all purposes.

FIELD

These teachings relate to a vehicle seat, and more particularly to a system and/or method of estimating an amount of energy flow to an occupant in a heated vehicle seat.

BACKGROUND

Some vehicles include one or more features for improving occupant comfort. For example, some vehicle seats include one or more heating systems for providing warmth to an occupant. While many systems are suitable for their intended purpose, it may be desirable to improve the current state of the art.

For example, it may be desirable to have a system and/or method of estimating energy flow to an occupant of a vehicle seat from one or more heating elements. For example, it may be desirable to have a system and/or method of determining or estimating the resistance of clothing worn by the one or more occupants in the vehicle. Such information may be useful for further improving occupant comfort.

SUMMARY

These teachings are directed to a system and/or method of estimating energy flow to an occupant of a vehicle seat from one or more heating elements. These teachings are directed to a system and/or method of determining or estimating the clothing resistance of the clothing worn by the one or more occupants in the vehicle

DETAILED DESCRIPTION

Figure 1:
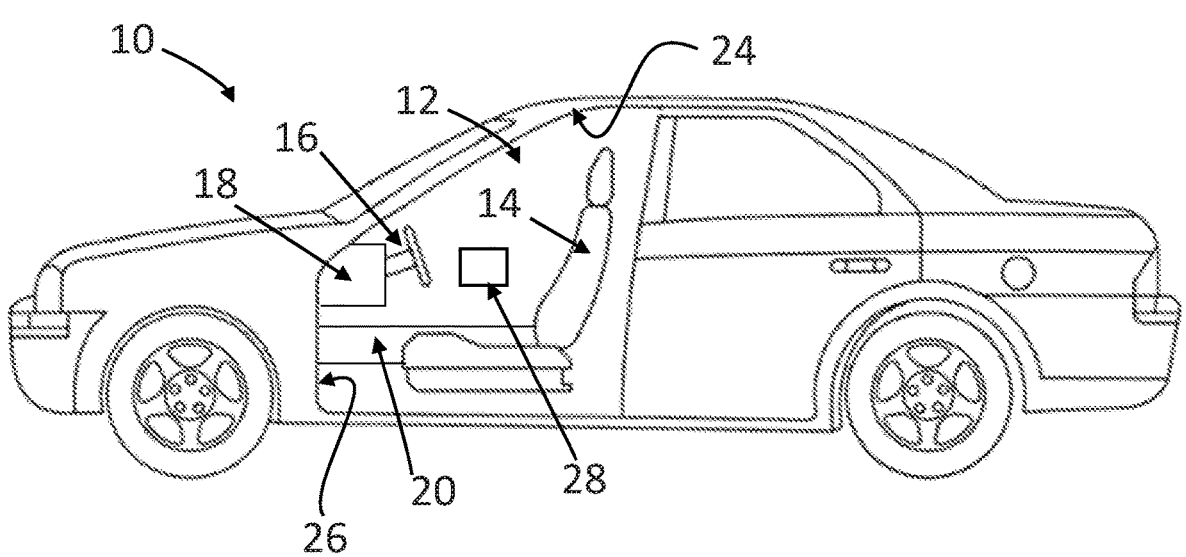
FIG. 1 is a side view of a vehicle that includes a vehicle seat.

FIG. 1 illustrates a vehicle 10. The vehicle 10 includes an occupant area or cockpit 12 that may include one or more vehicle seats 14. In addition to the one or more vehicle seats 14, the occupant area 12 may include one or more devices, such as a steering wheel 16, a dashboard 18, a console 20, a door panel 22, a headliner 24, and a foot well 26. One or more of the devices of the occupant area 12 may include one or more heating elements (e.g., heating element 36 in FIG. 2). The occupant area 12 or the one or more devices may include one or more sensors 28 for detecting or determining an ambient temperature of the inside of the occupant area 12 or region surrounding the vehicle seat 14.

Figure 2:
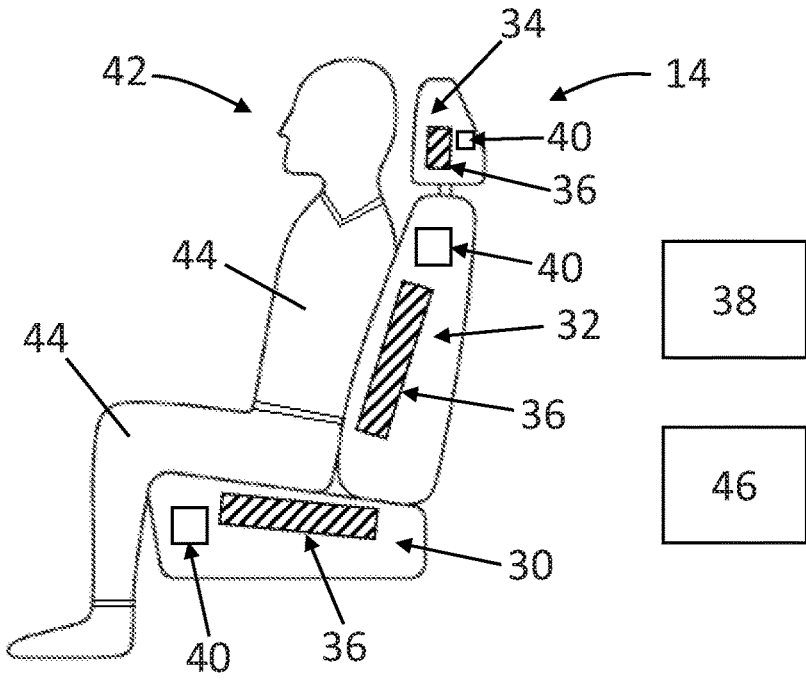
FIG. 2 is a side view of an occupant sitting in a vehicle seat.

FIG. 2 illustrates a vehicle seat 14. The vehicle seat 14 may include a seating portion 30, a backrest portion 32, and a headrest 34. One or more of the seating portion 30, the backrest portion 32, and the headrest 34 may include one or more heating elements 36. The one or more heating elements 36 may be configured to generate heat. The heat may be generated by the one or more heating elements 36 in response to a supply of power from a power source 38 that is electrically connected to the one or more heating elements 36. The one or more heating elements may be located anywhere on the vehicle sea or portions of the vehicle seat (e.g., seating portion, back rest portion, headrest, arm rests, bolsters, etc.). The one or more heating elements may be located at or near a bite line of the vehicle seat. The one or more heating elements may comprise a resistive wire to which the power source is connected to.

The vehicle seat 14, the seating portion 30, the backrest portion 32, the headrest 34, and/or the one or more heating elements 36 may include one or more sensors 40. The one or more sensors 40 may be enabled, configured, or used for measuring or determining a temperature of the vehicle seat 14, the seating portion 30, the backrest portion 32, the headrest 34, the one or more heating elements 36, and/or one or more other regions of the vehicle seat. The one or more sensors 40 may be part of the vehicle seat and/or part of the system for estimating the energy flow to the occupant and/or part of the vehicle 10 and/or provided by the vehicle OEM. The one or more sensors 40 may be the same as the one or more sensors 28 for detecting or determining an ambient temperature of the inside of the occupant area 12 or region surrounding the vehicle seat 14. The one or more sensors 28 and/or 40 may located within the structure of the vehicle seat 10, on the vehicle seat 10, or adjacent to the vehicle seat.

One or more controllers 46 may be in electrical communication with the one or more sensors 28, the one or more heating elements 36, the one or more sensors 40, the power source 38, or any combination thereof. The one or more controllers 46 may be part of the vehicle seat and/or part of the system for estimating the energy flow to the occupant and/or part of the vehicle 10 and/or provided by the vehicle OEM.

An occupant 42 wearing clothing 44 is illustrated sitting in the vehicle seat 14.

Figure 3:
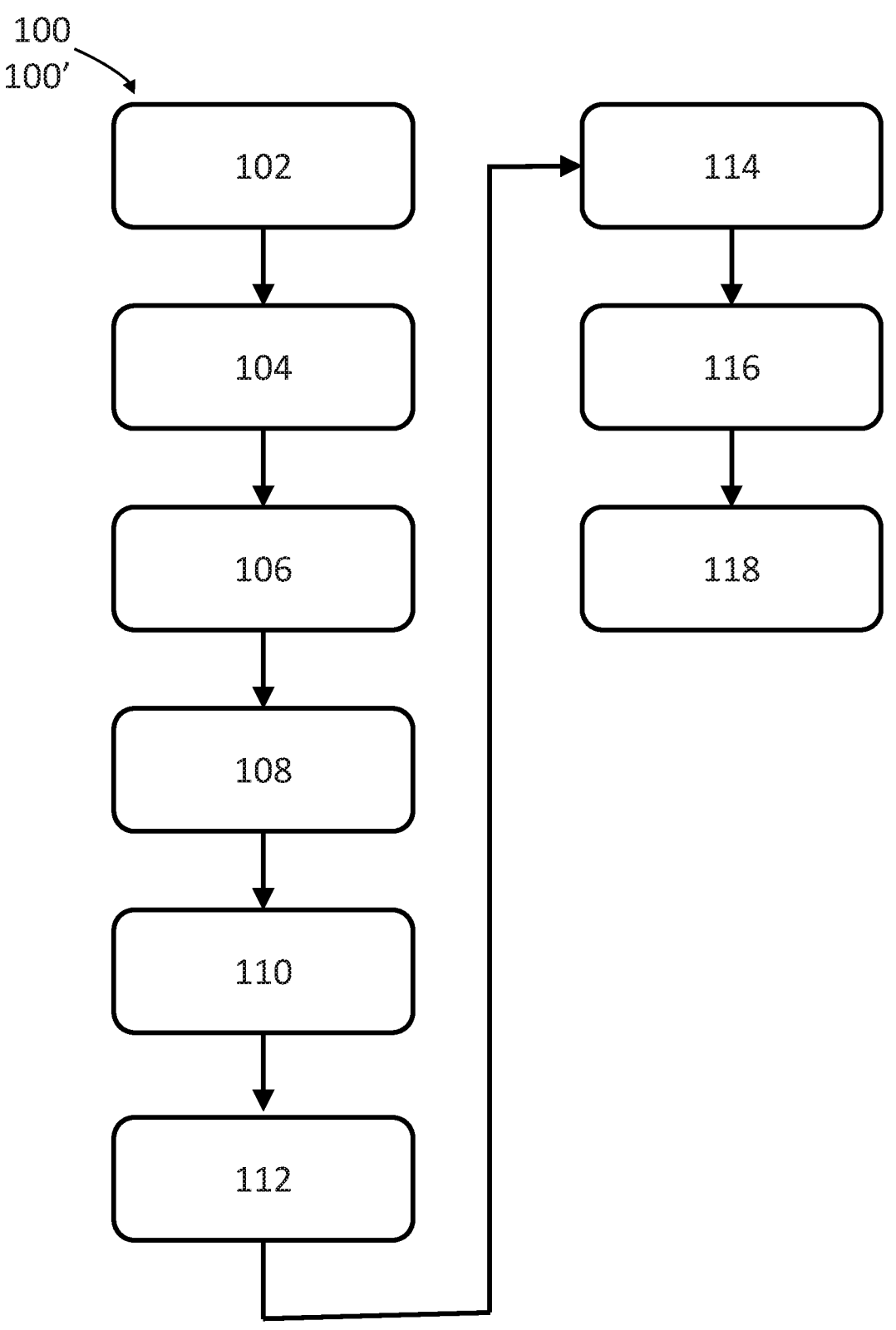
FIG. 3 is a flow chart that includes method steps.
Figure 4:
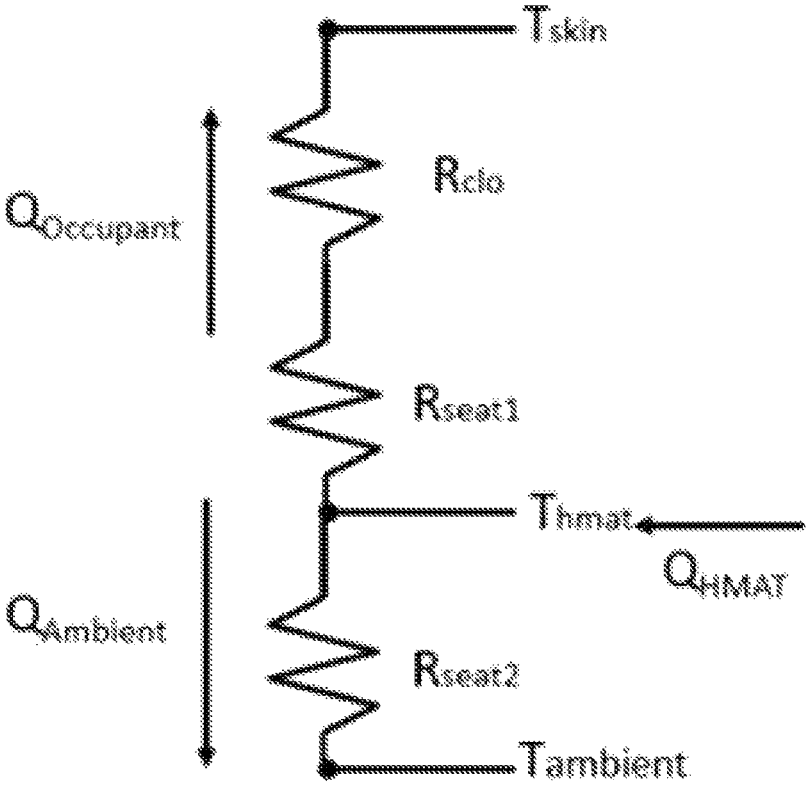
FIG. 4 is a diagram of a simplified vehicle seat stack up.

Referring now to FIG. 3, a method 100 is disclosed. The method 100 may be useful for estimating, determining, calculating, and/or inferring an amount of energy flowing from the one or more heating elements 36 and/or power source 38 to one or more occupants 42 in the vehicle 10 or vehicle seat 14.

The method 100 may be useful for/in estimating, determining, calculating, and/or inferring the clothing resistance of the clothing 44 worn by the one or more occupants 42 in the vehicle 10 and/or vehicle seat 14 (FIG. 2). For example, in some configurations, the method 100 may be used to estimate, determine, calculate, and/or infer thermal resistance in standard thermal resistance units such as (K/W) and/or (degrees C./W). Additionally, or alternatively, the method 100 may be used for estimating, determining, calculating, and/or inferring clothing resistance as CLO, which may be a value that describes the degree of insulation provided by an article of clothing. CLO may be defined as 1 Clo=0.155 m²K/W. For example, a CLO value of 1 may be equal to the amount of clothing required by a resting human to maintain thermal comfort at a room temperature of approximately 21 degrees Celsius or approximately 71 degrees Fahrenheit. A CLO value of 0 (zero) may correspond to a naked person. Table 1 below illustrates exemplary clothing resistance CLO values for common clothing.

TABLE 1

| CLO Value Example Chart | |
| --- | --- |
| Clothing | CLO Value |
| None | 0 |
| Briefs | .04 |
| Pants With Long Legs | .1 |
| Sleeveless shirt | .06 |
| T-shirt | .08 |
| Long-sleeved blouse | .15 |
| Short-sleeved shirt | .09 |
| Flannel shirt | .30 |
| Shorts | .06 |
| Trousers (Thin Fabric) | .15 |
| Trousers (Thick Fabric) | .24 |
| Work coveralls | .50 |
| Thin sweater | .20 |
| Thick sweater | .35 |
| Down jacket | .55 |
| Parka | .70 |
| Socks | .02 |
| Boots | .05 |
| Light skirt 15 cm above the knee | .01 |
| Heavy knee-length skirt | .25 |

By understanding the clothing resistance CLO or $R_{CLO}$ as referred to in this application, it may be feasible to adjust target temperature set points of the one or more heating elements 36 to improve occupant comfort and/or to reduce energy usage, which may be useful in a number of non-vehicular and vehicular applications, such as hybrid and electric vehicle applications as well as conventional internal combustion engine vehicles. For example, when it is determined that an occupant's clothing resistance $R_{CLO}$ is high or above a certain threshold value, the amount of energy supplied to the one or more heating elements 36 may be maintained or reduced, without negatively affecting the comfort of the occupant 42. On the other hand, when it is determined that the occupant's clothing resistance $R_{CLO}$ is low or below a certain threshold value, then the amount of energy supplied to the one or more heating elements 36 may be increased or maintained to maintain or increase the comfort of the occupant 42.

However, because the occupant's clothing resistance $R_{CLO}$ cannot be easily measured or determined in real time, without for example implementing complicated and expensive sensor technology into the vehicle or vehicle seat or requiring an occupant to know and input clothing resistance values into a computer every time they enter the vehicle, the method 100 according to these teachings can be used to infer, estimate, predict, or determine the clothing resistance value $R_{CLO}$ or a range of the clothing resistance $R_{CLO}$ worn by an occupant. This inference or estimation according to these teachings may be achieved by monitoring the electrical energy that is supplied from the power source 38 to the one or more heating elements 36 and then calculating, determining, estimating, or inferring the thermal energy transfer flowing to the occupant 42 using the conservation of energy and equations E1 and E2 below. It should be noted that the equations E1 and E2 assume the heating element 36 converts 100% or nearly 100% of the power supplied to the heating element 36 from the power source into heat energy. However, in some configurations, if it is determined that 100% of the power supplied from the power source to the one or more heating elements 36 is not converted into heat energy, then it may be advantageous or even necessary to apply a scaling factor to one or both equations E1, E2. This may help to more accurately infer, estimate, predict, or determine the clothing resistance value $R_{CLO}$ or a range of the clothing resistance $R_{CLO}$ $$Q_{HMAT} = Q_{OCCUPANT} + Q_{AMBIENT} \qquad \text{Equation E1}$$

$$V \times I = (T_{SKIN} - T_{HELEMENT})/(R_{CLO} + R_{SEAT1}) + (T_{AMBIENT} - T_{HELEMENT})/(R_{SEAT2}) \qquad \text{Equation E2}$$

$T_{SKIN}$=Estimated skin temperature of the occupant 42. This value $T_{SKIN}$ may represent a skin temperature of the occupant 42. For example, $T_{SKIN}$ may represent the skin temperature in a torso region of the occupant 42. Because this value may not necessarily change or fluctuate as much as compared to a skin temperature of the extremities of the occupant 42, such as hands, arms, legs, feet, etc., this value $T_{SKIN}$ may be estimated. For example, the estimated value for $T_{SKIN}$ may be about 34 degrees Celsius and may include a suitable tolerance range. In some configurations, an occupant may adjust or preset the $T_{SKIN}$ value to better customize comfort.

$R_{CLO}$=represents a resistance value of clothing worn by occupant 42 and may be solved for using the method discussed herein.

$R_{SEAT1}$=represents the thermal resistance of the vehicle seat 14, in a region of the one or more heating elements 36 and the occupant 42. This value may be a constant and may be measured or determined via experimentation. This value may represent the thermal resistance of some or all of the materials and articles between the one or more heating elements 36 and the occupant 42. For example, this value may represent a combined thermal resistance of some/any/all layers, materials, padding, foam, spacers, cover layers, leather, fabric, etc. that may be located between the one or more heating elements 36 and the occupant.

$R_{SEAT2}$=represents the thermal resistance of the vehicle seat 14 in a region other than, or not in between, the one or more heating elements 36 and the occupant 42. In other words, this value $R_{SEAT2}$ may represent a thermal resistance of the vehicle seat 14 in a region not used in the $R_{SEAT1}$ value. This value $R_{SEAT2}$ may be a constant and may be measured or determined via experimentation. For example, the value $R_{SEAT2}$ may represent a combined thermal resistance of any layers, materials, padding, foam, spacers, covers layers, leather, fabric etc. that may be typically part of a vehicle seat in regions other than those used in determining the $R_{SEAT1}$ value discussed above.

$T_{AMBIENT}$=represents the temperature of the occupant area or cockpit 12 or ambient region or atmosphere surrounding the occupant and/or the vehicle seat 14. This value may be received, obtained, measured, determined, or estimated in one or more of the method steps disclosed herein. For example, $T_{AMBIENT}$ may be received, obtained, measured, determined, or estimated in step 104.

$T_{HELEMENT}$=represents the temperature of the one or more heating element 36. This value may be received, obtained, measured, determined, or estimated in one or more of the method steps disclosed herein. For example, $T_{HELEMENT}$ may be received, obtained, measured, determined, or estimated in step 110.

V=represents Voltage. This value may be received, obtained, measured, determined, or estimated in one or more of the method steps disclosed herein. For example, Voltage V may be received, obtained, measured, determined, or estimated in step 108.

I=represents current. This value may be received, obtained, measured, determined, or estimated in one or more of the method steps disclosed herein. For example, Current I may be received, obtained, measured, determined, or estimated in step 108.

It is understood that any of the method steps disclosed herein can be performed in virtually any order. One or more of the method steps disclosed herein can be combined with one or more other steps disclosed herein into one or more new or amended method steps. One or more of the method steps disclosed herein can be skipped, omitted, or temporarily or permanently eliminated; can be repeated; and/or can divided or separated into individual or additional steps. One or more of the method steps disclosed herein may be performed at the same time as one or more method steps (i.e., not sequentially). One or more of the method steps disclosed herein may be performed sequentially, meaning a prior step(s) must be completed or attempted before a subsequent step may begin or may be completed. Moreover, one or more additional steps, which may not be expressly disclosed herein, may be added to one or more of the method steps disclosed herein. However, in some configurations, the method steps disclosed herein may be or must be performed in the order or sequence disclosed herein without any changes or modifications.

With continued reference to FIG. 3, the method 100 may include a step 102 of: activating the system 100'. This step 102 may occur automatically after the vehicle 10 is turned ON, the occupant 42 enters the occupant area 12, the occupant 42 is seated in the vehicle seat 14, and/or after a temperature inside of the occupant area 12 or surface temperature of the vehicle seat 14 falls below a predetermined or predefined threshold. This system 100' or method 100 may also, or may instead, be activated by the occupant 42 by, for example, by issuing one or more commands (pushing or repositioning one or more buttons, dials, knobs, by voice commands, etc.), The system 100' for estimating energy flow to an occupant from one or more heating elements and/or adjusting one or more heating elements of a vehicle seat may comprise one or more of any of the elements disclosed herein. Alternatively, the system 100' according to the teachings may utilize one or more elements or features that are already present in a vehicle and provided by the vehicle OEM. For example, the controller 46 disclosed herein may be a controller specifically developed for the system 100' or the controller 46 may be part of the vehicle control system. Similarly, the one or more sensors 28 and/or 40 may be specific sensors for use by the method or system disclosed herein, or the one or more sensors 28 and/or 40 may be part of the vehicle and supplied by the vehicle OEM for monitoring a temperature for use in other systems of the vehicle.

The method 100 may include a step 104 of: receiving, obtaining, measuring, determining, or estimating an ambient temperature 102 of the occupant area or cockpit 12. This step 104 may be used for receiving, obtaining, measuring, determining, or estimating $T_{AMBIENT}$ for use in Equation 2. The ambient temperature may be received, obtained, measured, determined, or estimated by the one or more sensors 28 and/or 40. The one or more sensors 28 and/or 40 may be part of the vehicle seat and/or part of the system for estimating the energy flow to the occupant and/or part of the vehicle 10 and provided by the vehicle OEM. The ambient temperature of the occupant area 12 may be obtained by or communicated from the one or more sensors to the controller 46. The controller 46 may be part of the vehicle seat and/or part of the system for estimating the energy flow to the occupant and/or part of the vehicle 10 and provided by the vehicle OEM.

The method 100 may include a step 106 of: supplying, providing, or sending power to the one or more heating elements 36. The power may be provided by one or more power sources 38. The power source 38 may be any suitable power source, such as a battery, the vehicle battery, a battery only for powering the heating elements 36 and/or other features of the occupant area 12, the controller 46, a generator, a solar panel, an alternator, the like, or a combination thereof. The power may be supplied to the one or more heating elements 36 via wires or a wireless transmission. The power source 38 may be part of the vehicle seat and/or part of the system for estimating the energy flow to the occupant and/or part of the vehicle 10 and provided by the vehicle OEM.

The method 100 may include a step 108 of: measuring, determining, monitoring, or calculating the amount of power supplied to the one or more heating elements 36 or obtaining a value representative of the power supplied to the one or more heating elements 36. The amount of power supplied to the one or more heating elements 36 may be supplied by or obtained from the power source 38, the one or more heating elements 36, the controller 46, or a combination thereof. The amount of power supplied to the one or more heating elements 36 may be obtained or calculated by monitoring voltage V and current I supplied by the power source 38 and/or received by the one or more heating elements 36. The amount of power supplied to the one or more heating elements 36 may be referred to as $Q_{HMAT}$ for use in Equation 1 and discussed at step 114. This step 108 may be used for measuring, determining, monitoring, or calculating voltage V and current I for use in Equation 2. Electrical power may be calculated by multiplying voltage V and current I. This step may be performed by the controller 46, or by another controller, one or both of which may be part of the vehicle seat, the system for estimating the energy flow to the occupant and/or part of the vehicle 10 and provided by the vehicle OEM.

The method 100 may include a step 110 of: determining, measuring, obtaining, or calculating a temperature of the one or more heating elements 36. The temperature of the one or more heating elements 36 may be obtained from the one or more sensors 28 and/or 40, using a look up table based on the amount of power supplied to the one or more heating elements 36 from step 104 and/or 106. The temperature of the heating element 36 may be the actual temperature of one or more heating elements 36. However, because the temperature of the one or more heating elements 36 may not be always uniform, this temperature may be an average temperature that is outputted by one or more of the heating elements 36 or an average temperature outputted by the heating element 36 in different areas or section of the heating element 36 and/or in different regions or locations of the heating element 36 and/or within a certain amount of time. Accordingly, this step 110 may also, or may instead be referred to as determining, measuring, or calculating an average temperature of the one or more heating elements 36. This step 110 may be used for determining, measuring, obtaining, or calculating $T_{HELEMENT}$ for use in Equation 2. This step 110 may be performed by the controller 46, or by another controller, one or both of which may be part of the vehicle seat, the system for estimating the energy flow to the occupant and/or part of the vehicle 10 and provided by the vehicle OEM.

The method 100 may include a step 112 of: determining a heat loss from the one or more heating elements 36 or vehicle seat 14 to the ambient environment or atmosphere surrounding the occupant and/or vehicle seat 14. The value may be determined during this step 112 and may be based on a difference between the ambient cabin temperature (e.g., from step 104) and the temperature of the one or more heating elements 36 (e.g., from step 110). The heat loss value may also, or instead, be found experimentally or calculated based on vehicle seat design. The heat loss value may also, or instead, be based on a lookup tables or calculated from heat transfer equations. This step may be performed by the controller 46, or by another controller, one or both of which may be part of the vehicle seat, the system for estimating the energy flow to the occupant and/or part of the vehicle 10 and provided by the vehicle OEM. The heat loss value from step 112 may be referred to as $Q_{AMBIENT}$ for use in Equation 1 and discussed at step 114.

The method 100 may include a step 114 of: estimating, determining, calculating, or otherwise deriving an amount of heat transferred from the one or more heating elements 36 or vehicle seat 14 to the occupant 42 in the vehicle seat 14. The value determined during this step 114 may be calculated or estimated using Equation 1 above, based on the measured or monitored amount of power supplied to the one or more heating elements from step 108 ($Q_{HMAT}$) and the amount of heat loss determined from step 112 ($Q_{AMBIENT}$). This step may be performed by the controller 46, or by another controller, one or both of which may be part of the vehicle seat, the system for estimating the energy flow to the occupant and/or part of the vehicle 10 and provided by the vehicle OEM.

The method 100 may include a step 116 of: estimating, determining, calculating, inferring, or otherwise deriving the clothing resistance of clothing worn by occupant 42. The estimated, determined, calculated, inferred, or otherwise derived clothing resistance may be a CLO value $R_{CLO}$ and/or a thermal resistance value in units such as (K/W) and/or (degrees C./W). The clothing resistance $R_{CLO}$ of clothing worn by occupant 42 may be calculated using Equation 2 above, since by this step 116, all values for use in Equation 2 to solve for $R_{CLO}$ are known. In another configuration, the clothing resistance $R_{CLO}$ may be predicted by monitoring the energy flow into the occupant and the known temperature difference between the one or more heating elements and the occupant 42.

The clothing resistance $R_{CLO}$ may be estimated, determined, calculated, inferred, or otherwise derived for individual parts of the vehicle seat. In other words, a clothing resistance $R_{CLO}$ value may be determined in a seating portion 30 of the vehicle seat and a separate value may be determined for a backrest portion 32 of the vehicle seat. This may allow for separate or individual control or tuning of the one or more heating elements in each part of the vehicle seat to further improve occupant comfort. For example, if an occupant is wearing shorts and a thick sweatshirt, then the $R_{CLO}$ value in the seating portion may be lower than the $R_{CLO}$ value backrest portion. Accordingly, the method or system may determine or infer this difference and control the one or more heating elements in the backrest portion differently than the one or more heating elements in the seating portion. However, in some configurations, an average $R_{CLO}$ value may be determined based on the total or overall $R_{CLO}$ value of the occupants clothing, and therefore all of the one or more heating elements may be controlled simultaneously.

The method 100 may include a step 118 of: adjusting, changing, increasing, decreasing, the amount of power supplied to the one or more heating elements 36. The amount of power in this step 116 may be based on the estimated amount of heat transferred from the heating element 36 or vehicle seat 14 from step to occupant 42 in the vehicle seat 14 from step 114 and/or based on the estimated or determined closing resistance $R_{CLO}$ determined in Step 116. This step may be performed by the controller 46, or by another controller, one or both of which may be part of the vehicle seat, the system for estimating the energy flow to the occupant and/or part of the vehicle 10 and provided by the vehicle OEM. This step of adjusting the power supplied to the one or more heating elements 36 may be to a specific region of the seat (i.e., only to the headrest, only to the back rest, only to the seating portion, or only to the arm rests) or the adjustment may be to some or all the heating elements in the entire seat (i.e., two or more of the headrest, sealing portion, back rest portion, arm rests, etc.). Of course, the step of adjusting, changing, increasing, decreasing, the amount of power supplied to the one or more heating elements 36 may also, or may instead, occur after the $R_{CLO}$ is calculated.

The calculations in the method according to these teachings may be performed by one or more computers or processors. The one or more computers or processors may be located within the vehicle, the vehicle seat. Additionally, or alternatively, the one or more computers or processors may be located in the cloud or a remote location and communicated to the vehicle via a wired or wireless communication protocol.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a sensor" does not limit the teachings to a single sensor. Instead, for example, disclosure of "a sensor" may include "one or more sensors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein may suitably be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

The invention claimed is:

1. A system for a vehicle seat in a vehicle, comprising:
a) one or more heating elements configured to generate heat when power is supplied to the one or more heating elements from a power source; and
b) a controller configured to:
    i. determine or receive a value representative of an ambient cabin temperature inside of the vehicle;
    ii. supply the power to the one or more heating elements or send a signal to the power source to supply the power to the one or more heating elements;
    iii. measure the power supplied to the one or more heating elements or obtain a value representative of the power supplied to the one or more heating elements;
    iv. determine or calculate an average temperature outputted by the one or more heating elements;
    v. determine heat loss from the vehicle seat to atmosphere surrounding the vehicle seat based on a temperature difference between the ambient cabin temperature and the average temperature outputted by the one or more heating elements;
    vi. estimate an amount of heat transferred from the vehicle seat to an occupant of the vehicle seat based on the power supplied to the one or more heating elements and the determined heat loss from the vehicle seat to the atmosphere surrounding the vehicle seat;
    vii. determine a clothing resistance of closing worn by the occupant of the vehicle seat; and viii. adjust the power supplied to the one or more heating elements based on the estimated amount of heat transferred from the vehicle seat to the occupant.

2. The system according to claim 1, wherein the clothing resistance is determined using values representing voltage and/or current derived from the power that is supplied to the one or more heating elements.

3. The system according to claim 1, wherein the clothing resistance is determined using values representing voltage and current supplied to the one or more heating elements, the ambient cabin temperature, and the average temperature outputted by the one or more heating elements.

4. The system according to claim 1, wherein the clothing resistance is determined using an estimated skin temperature of the occupant.

5. The system according to claim 1, wherein the heat loss from the vehicle seat is determined by a difference between the ambient cabin temperature and the temperature outputted by the one or more heating elements.

6. The system according to claim 1, wherein the controller is part of the system, or the controller is part of the vehicle and is utilized by the system.

7. The system according to claim 1, wherein the one or more heating elements is/are located at or near a bite line of the vehicle seat.

8. The system according to claim 1, wherein the one or more heating elements comprise one or more resistive wire heaters.

9. A vehicle seat comprising the system according to claim 1.

10. A method of adjusting power supplied to one or more heating elements of a vehicle seat in a vehicle, the method comprising:
    i. determining an ambient cabin temperature inside of the vehicle;
    ii. suppling power to the one or more heating elements or sending a signal to a power source to supply the power to the one or more heating elements;
    iii. measuring the power supplied to the one or more heating elements or obtaining a value representative of the power supplied to the one or more heating elements;
    iv. determining or calculating an average temperature of the one or more heating elements;
    v. determining a heat loss from the vehicle seat to atmosphere surrounding the vehicle seat based on a temperature difference between the ambient cabin temperature and the average temperature of the one or more heating elements;
    vi. estimating an amount of heat transferred from the vehicle seat to an occupant of the vehicle seat based on the power supplied to the one or more heating elements and the determined heat loss from the vehicle seat to the atmosphere surrounding the vehicle seat;
    vii. determining a clothing resistance of clothing worn by the occupant of the vehicle seat; and
    viii. adjusting the power supplied to the one or more heating elements based on the estimated amount of heat transferred from the vehicle seat to the occupant and/or based on the clothing resistance of the clothing worn by the occupant.

11. The method according to claim 10, wherein the clothing resistance is determined using an equation that includes values representing voltage, current, the ambient cabin temperature, and the average temperature of the one or more heating elements.

12. The method according to claim 10, wherein the determining the amount of heat loss step is determined by a difference between the ambient cabin temperature and the average temperature of the one or more heating elements.

13. The method according to claim 10, wherein the method comprises an activating step, that occurs automatically after the vehicle is turned ON or after the occupant enters the vehicle.

14. The method according to claim 10, wherein the determining the clothing resistance step includes considering a thermal resistance of the vehicle seat in a region between the one or more heating elements and the occupant.

15. The method according to claim 10, wherein the determining the clothing resistance step includes using-considering a thermal resistance of the vehicle seat in a region other than between the one or more heating elements and the occupant.

\* \* \* \* \*